United States Patent
You et al.

(10) Patent No.: US 11,276,888 B2
(45) Date of Patent: Mar. 15, 2022

(54) SECONDARY BATTERY INSPECTION APPARATUS AND METHOD

(71) Applicants: Kwangyong You, Namyangju-si (KR); Sunggeun Ji, Hwaseong-si (KR)

(72) Inventors: Kwangyong You, Namyangju-si (KR); Sunggeun Ji, Hwaseong-si (KR)

(*) Notice: Subject to any disclaimer, the term of this patent is extended or adjusted under 35 U.S.C. 154(b) by 317 days.

(21) Appl. No.: 16/700,183

(22) Filed: Dec. 2, 2019

(65) Prior Publication Data
US 2020/0350637 A1    Nov. 5, 2020

(30) Foreign Application Priority Data
May 3, 2019    (KR) ........................ 10-2019-0052496

(51) Int. Cl.
     *H01M 10/42*      (2006.01)
     *G01N 23/04*      (2018.01)

(52) U.S. Cl.
     CPC ........ *H01M 10/4285* (2013.01); *G01N 23/04* (2013.01)

(58) Field of Classification Search
CPC .. H01M 10/4285; H01M 10/052; H01M 4/13; H01M 10/425; H01M 10/482; H01M 2010/4271; G01N 23/04; C01D 15/04; H02J 7/0021; H02J 7/007; H02J 7/0014; H02J 7/0045; Y02E 60/10
USPC ... 324/425–435, 500, 750.3, 757.04, 762.03, 324/600, 663, 671, 200, 207.13, 207.22, 324/239, 241, 515, 520, 530, 76.11, 324/105–124
See application file for complete search history.

(56) References Cited

U.S. PATENT DOCUMENTS 8,557,413 B2 * 10/2013 Tamura ................. H01M 4/661
                                                      429/50
10,811,726 B2 * 10/2020 Aihara ............. H01M 10/0561

FOREIGN PATENT DOCUMENTS

| KR | 10-0745586 B1 | 8/2007 |
|---|---|---|
| KR | 10-0982025 B1 | 9/2010 |
| KR | 10-2011-0018081 A | 2/2011 |
| KR | 10-2014-0082935 A | 7/2014 |
| KR | 10-2017-0016179 A | 2/2017 |

\* cited by examiner

*Primary Examiner* — Vincent Q Nguyen
*Assistant Examiner* — Trung Q Nguyen
(74) *Attorney, Agent, or Firm* — NSIP Law

(57) ABSTRACT

A secondary battery inspection apparatus includes a support unit configured to support a secondary battery set including at least one secondary battery, an X-ray source configured to radiate an X-ray beam to the secondary battery set, and an X-ray detector configured to detect the X-ray beam generated from the X-ray source and passing through the secondary battery set, wherein the secondary battery set is divided into an interest area and a non-interest area, the support unit rotates the secondary battery set in place, and at least one selected from a division angle between a plurality of X-ray radiation points and an X-ray radiation time is differentiated depending on whether the X-ray source photographs the interest area or whether the X-ray source photographs the non-interest area.

8 Claims, 8 Drawing Sheets

[Fig.1]
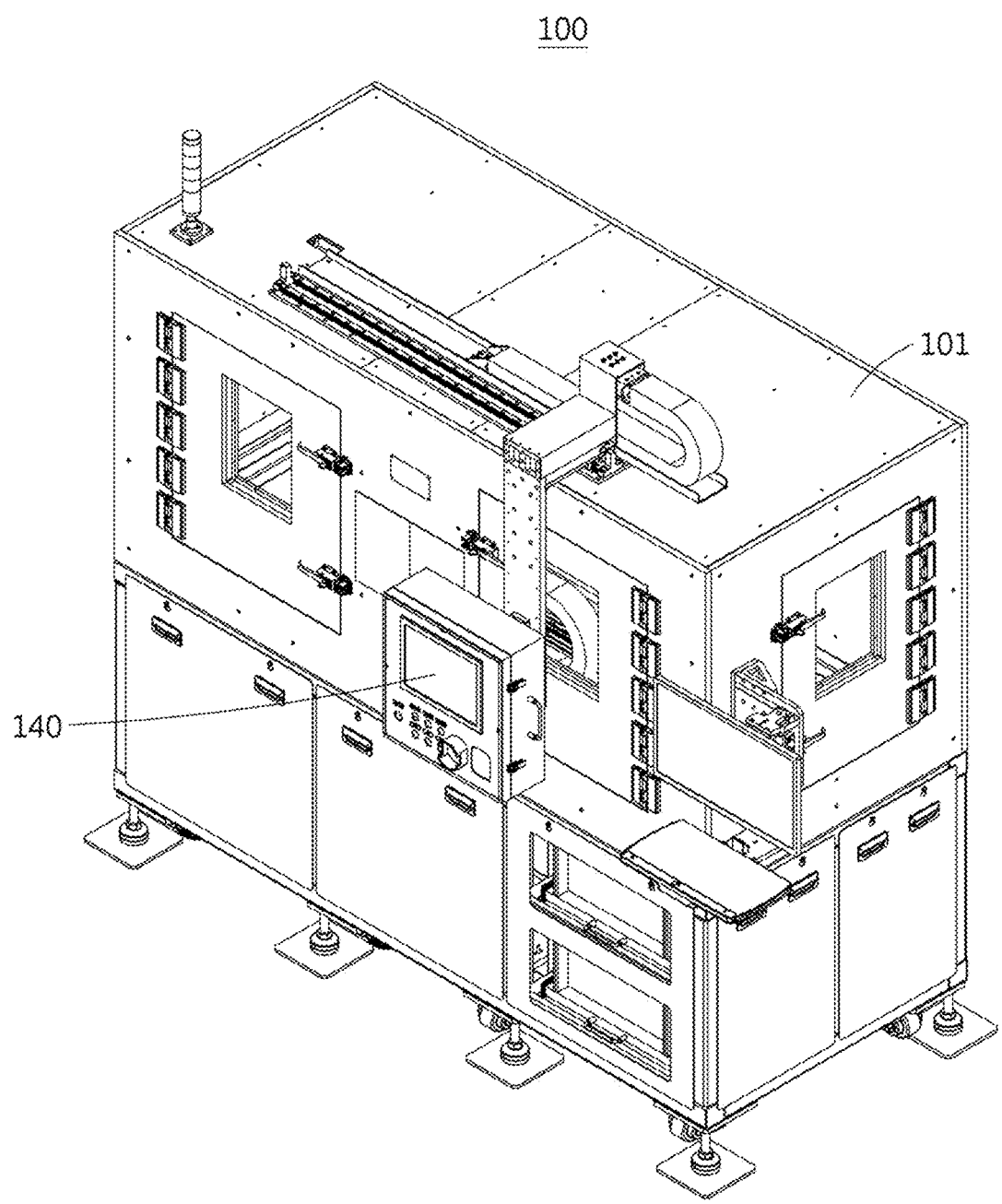

[Fig.2]
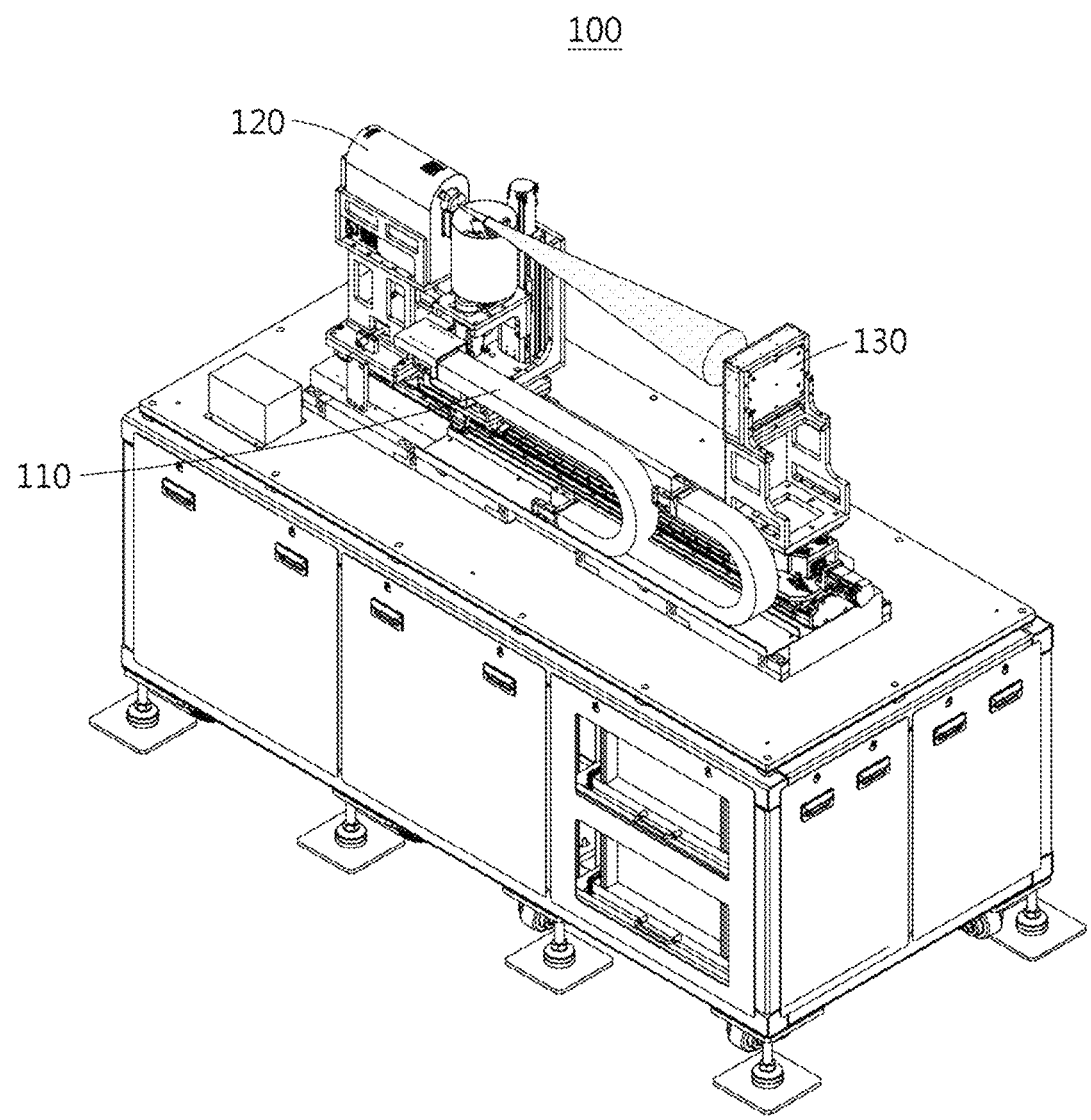

[Fig.3]
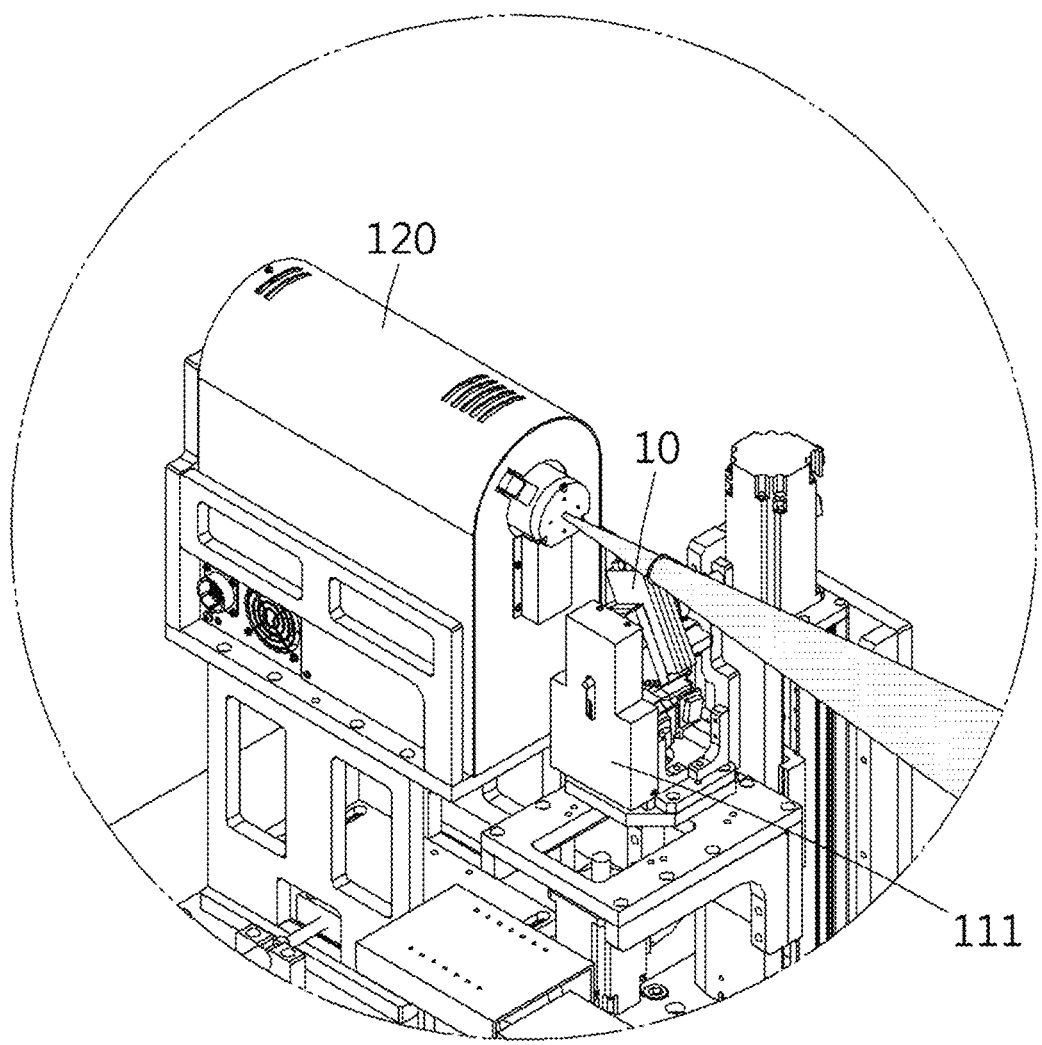

[Fig.4]
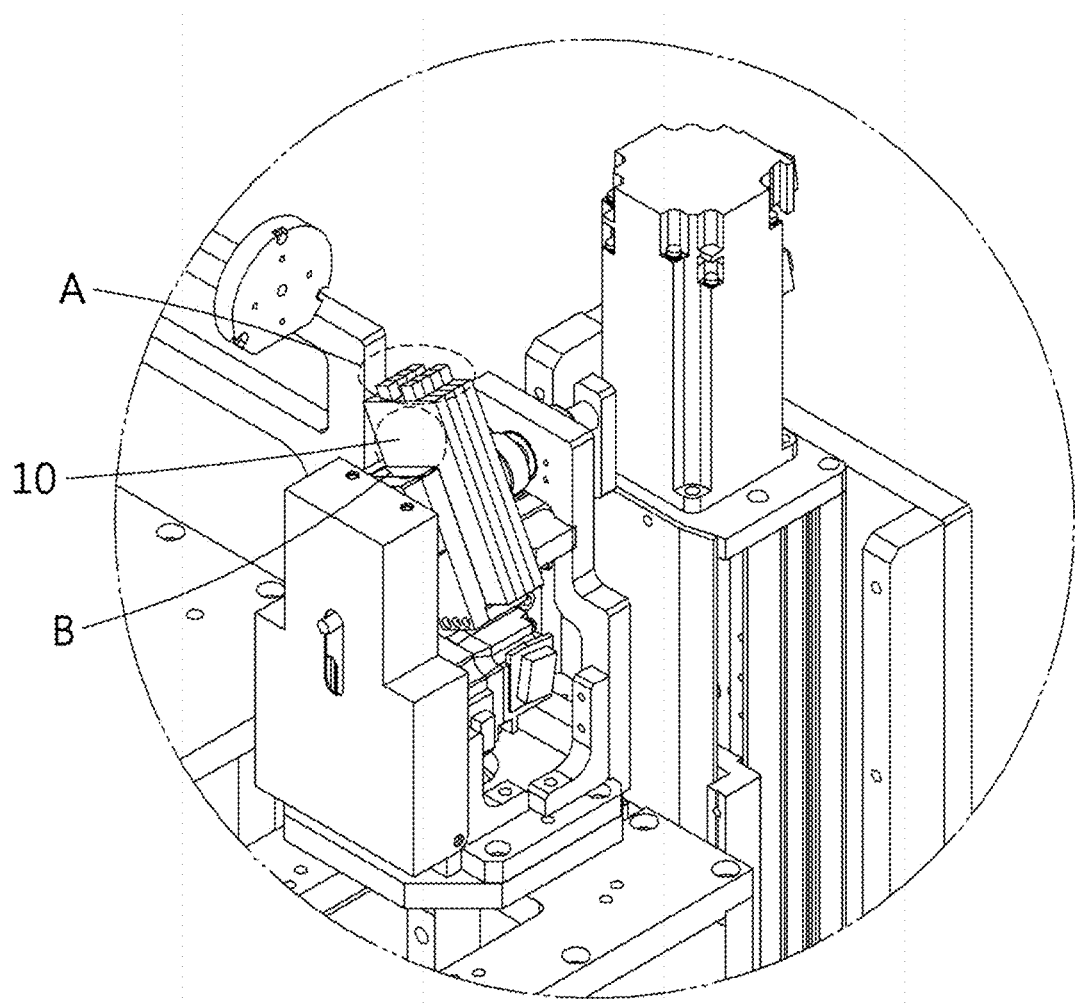

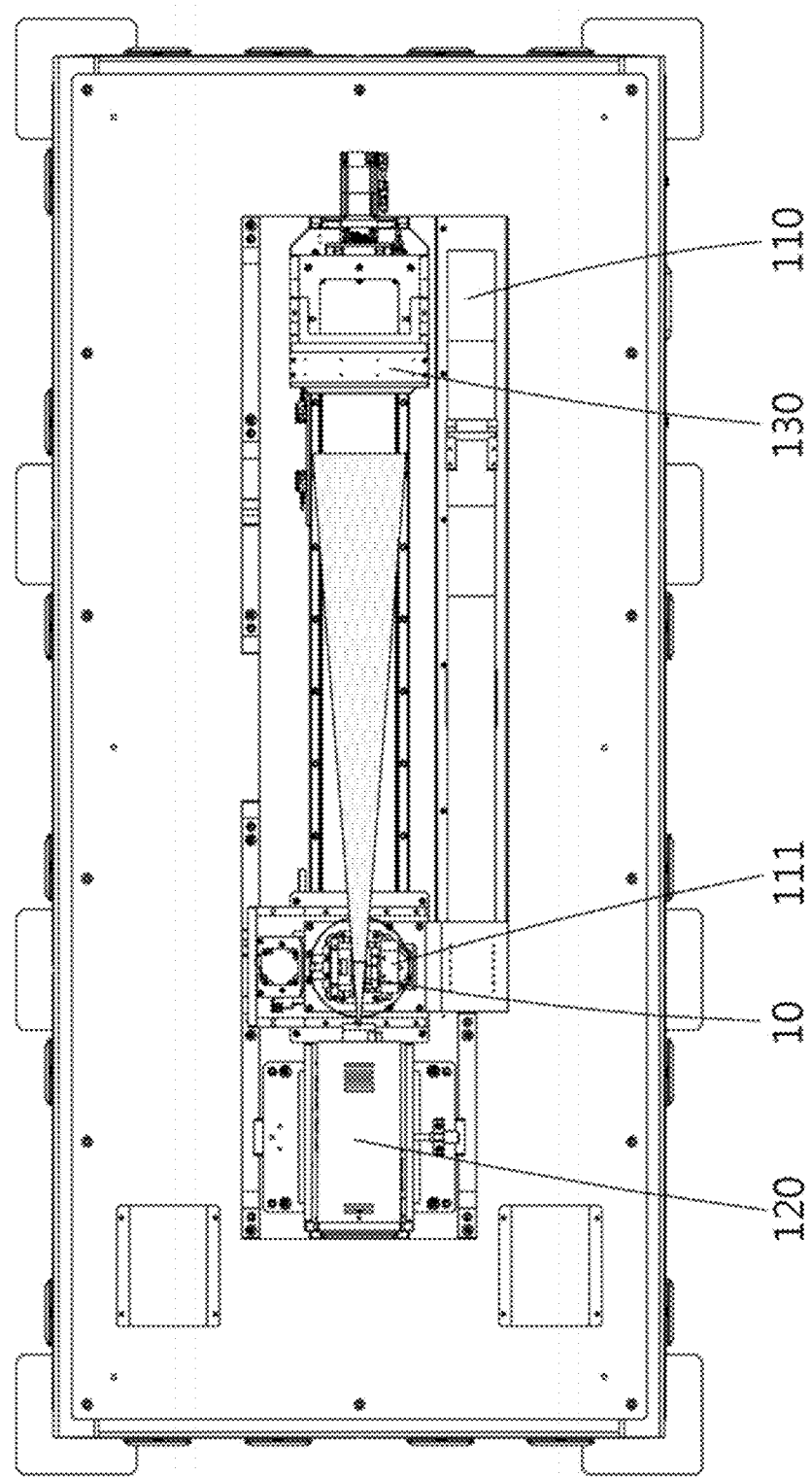
[Fig. 5]

[Fig.6]
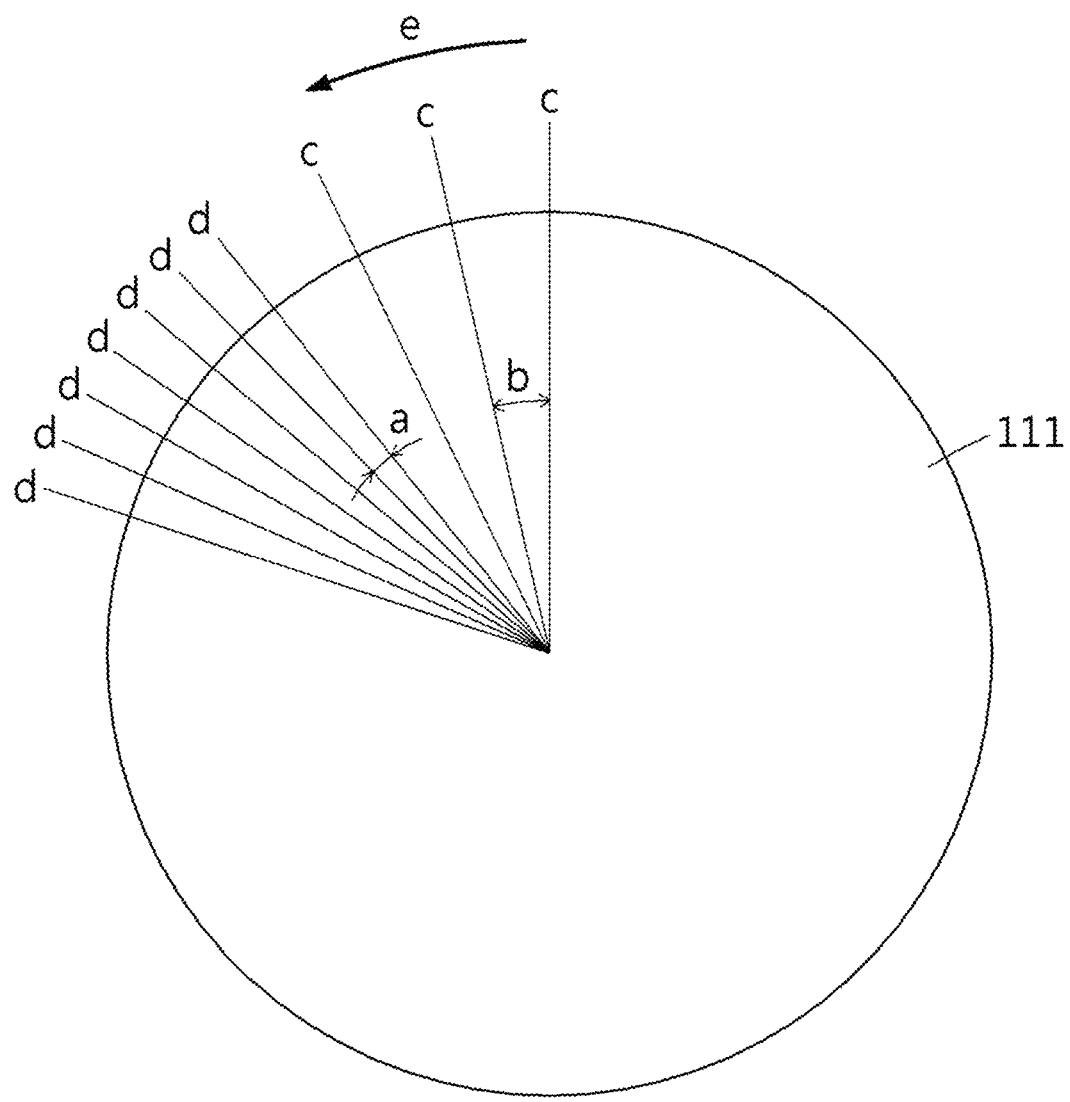

[Fig.7]
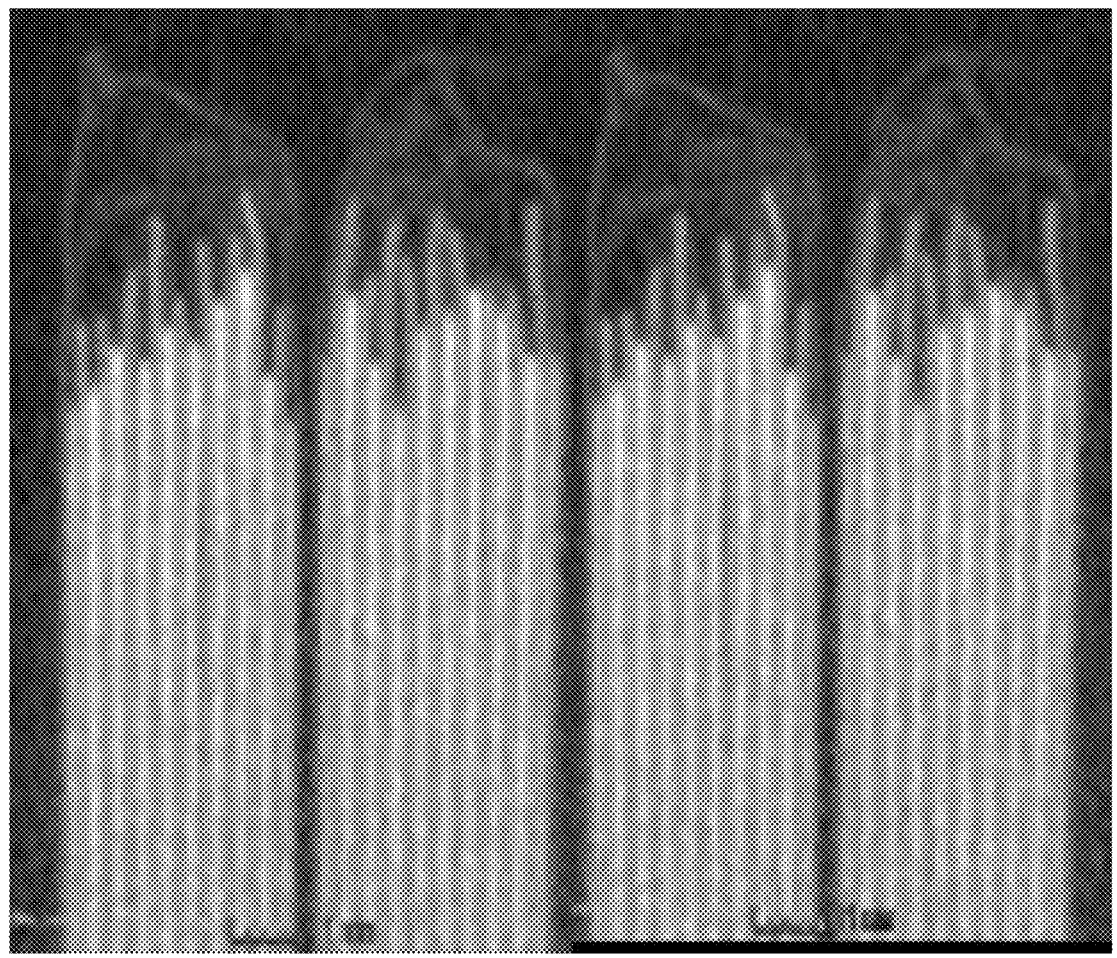

[Fig.8]
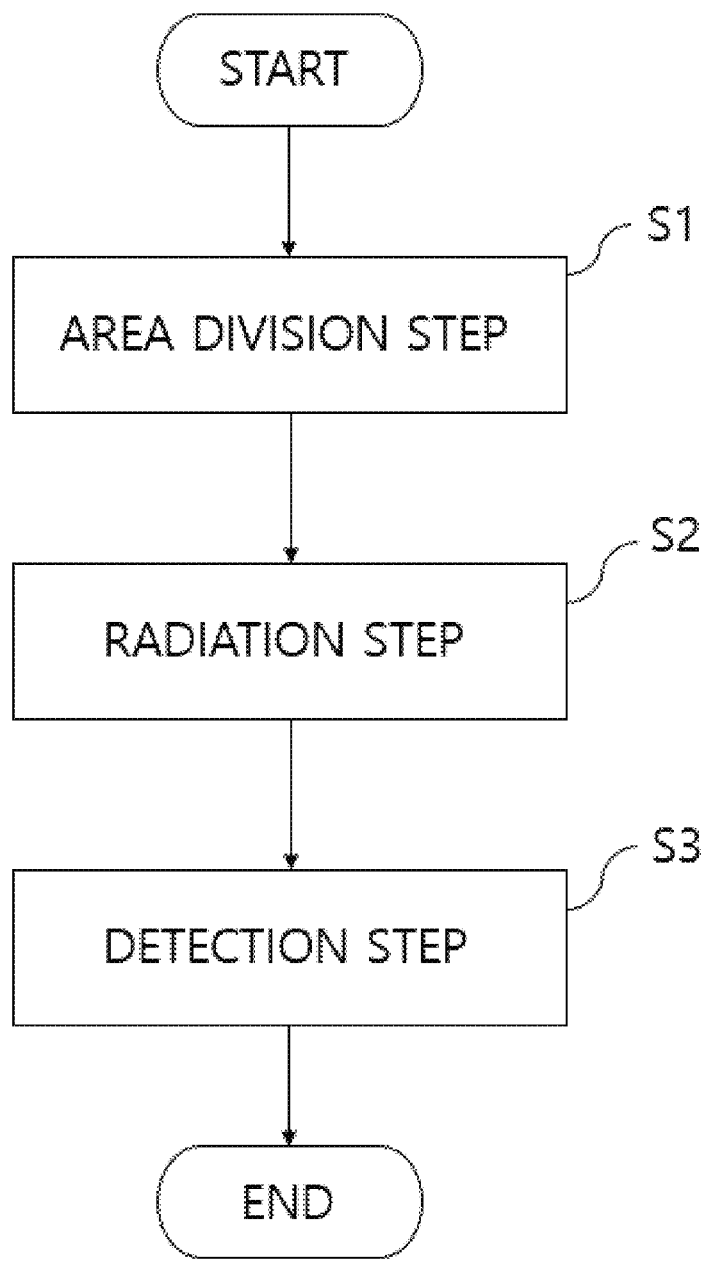

SECONDARY BATTERY INSPECTION APPARATUS AND METHOD

CROSS-REFERENCE TO RELATED APPLICATIONS

This application claims the benefit under 35 USC § 119(a) of Korean Patent Application No. 10-2019-0052496 filed on May 3, 2019 in the Korean Intellectual Property Office the entire disclosures of which are incorporated herein by reference for all purposes

DESCRIPTION

Technical Field

The present disclosure relates to a secondary battery inspection apparatus, and more particularly, to a secondary battery inspection apparatus that may divide a secondary battery into an interest area and a non-interest area and differentiate an X-ray photographing division angle and an X-ray radiation time depending on the interest area or the non-interest area to thereby ensure reliability of an inspection result without deterioration of quality of a detected image even when a plurality of secondary batteries are inspected simultaneously, wherein the interest area relates comparatively greatly to detection of defective goods and quality inspection with respect to the secondary battery and the non-interest area relates comparatively less thereto.

Background Art

Since secondary batteries are formed by stacking a plurality of electrode layers therein, when ends of the electrode layers are attached to each other or the like, there is a high concern about the occurrence of a short circuit. Accordingly, there is a definite need for a process of inspecting secondary batteries and selecting defective secondary batteries before release.

General inspection apparatuses for inspection of whether secondary batteries are defective uniformly divide and photograph each of the secondary batteries, perform three-dimensional (3D) reconstruction processing on the secondary batteries, detect the tomography of preset portions of the secondary batteries, and then inspect the degree of protrusion between electrodes (overhang inspection), that is, the degree of alignment in which internal electrode layers of the secondary batteries are stacked, to thereby determine whether the secondary batteries are defective or non-defective.

In this case, since whether the secondary batteries are defective may be determined by inspecting each of the secondary batteries, a long inspection time is needed. Accordingly, it is determined that inspection cannot be performed on all secondary batteries produced at an actual industrial site. Thus, only some of the secondary batteries, sampled at random, may be inspected.

In addition, due to a limit in general technology, since all defective goods cannot be selected using a result of inspecting some of the sampled secondary batteries, there is a drawback in that stability of secondary batteries on the market cannot be ensured.

In addition, when a plurality of secondary batteries are inspected at once instead of inspecting secondary batteries one by one, the size of the secondary batteries in an image to be detected is large. Thus, there is a drawback in that the resolution of the image may be reduced and the accuracy of the inspection result may be deteriorated.

In addition, since all angles of the secondary batteries are uniformly photographed, as not only images of necessary portions but also images of unnecessary portions of the secondary batteries are detected, there is a drawback in that a long inspection time may be needed and inefficiency may result.

PRIOR ART DOCUMENT

Patent Document (Patent Document 0001) Patent Registration No. 10-0745586 (Battery Inspection Apparatus)

DISCLOSURE

Technical Problem

In order to address several drawbacks including the aforementioned drawbacks, the present disclosure includes a secondary battery inspection apparatus that may divide a secondary battery into an interest area and a non-interest area and control a set value for image detection to thereby ensure reliability of an inspection result without deterioration of quality of a detected image even when a plurality of secondary batteries are inspected simultaneously, wherein the interest area relates comparatively greatly to detection of defective goods with respect to the secondary battery and the non-interest area relates comparatively less to detection of defective goods and inspection of quality.

In addition, a secondary battery inspection apparatus may be provided that may inspect a plurality of secondary batteries together, and thus inspect all secondary batteries rapidly.

In addition, since all defective goods may be selected by inspecting all secondary batteries produced, a secondary battery inspection apparatus may be provided that may ensure stability of secondary batteries on the market.

Advantages and features of the present disclosure and methods for achieving them will become apparent to one of skill in the art from the descriptions of aspects hereinbelow with reference to the accompanying drawings.

Technical Solution

An aspect of the present disclosure is to provide a secondary battery inspection apparatus including a support unit configured to support a secondary battery set including at least one secondary battery, an X-ray source configured to radiate an X-ray beam to the secondary battery set, and an X-ray detector configured to detect the X-ray beam generated from the X-ray source and passing through the secondary battery set, wherein the secondary battery set is divided into an interest area and a non-interest area, the support unit rotates the secondary battery set in place, and at least one selected from a division angle between a plurality of X-ray radiation points and an X-ray radiation time is differentiated depending on whether the X-ray source photographs the interest area or whether the X-ray source photographs the non-interest area.

When the X-ray source photographs the interest area of the secondary battery set, the division angle between a plurality of X-ray radiation points may be relatively small compared to when the non-interest area of the secondary battery set is photographed.

When the X-ray source photographs the interest area of the secondary battery set, a period of time an X-ray beam is radiated to the secondary battery set may be relatively long compared to when the non-interest area of the secondary battery set is photographed.

The support unit may rotate the secondary battery set in place, positions of the X-ray source and the X-ray detector may be fixed, and when the X-ray source photographs the interest area of the secondary battery set, a rotation speed of the support unit may be less compared to when the X-ray source photographs the non-interest area of the secondary battery set.

The at least one secondary battery may be provided by stacking a plurality of electrode layers with a plate shape in the at least one secondary battery, and the interest area of the secondary battery set may be a border portion in which a stack state or an alignment state of the plurality of electrode layers in the at least one secondary battery may be checked.

The at least one secondary battery may be provided to have a rectangular parallelepiped shape, the interest area of the secondary battery set may be the border portion or an edge portion in which the stack state or an alignment state of the plurality of electrode layers in the at least one secondary battery may be checked, and the non-interest area of the secondary battery set may be a plane portion of an outer circumference surface of the at least one secondary battery in which the stack state or the alignment state of the plurality of electrode layers in the at least one secondary battery may not be checked.

A plurality of secondary batteries in the secondary battery set may be combined with one another so that a plurality of electrode layers in each of the plurality of secondary batteries are arranged in parallel.

At least four secondary batteries may be combined with one another in parallel in the secondary battery set.

The X-ray source may have a rated output of at least 150 kV.

An aspect of the present disclosure is to provide a secondary battery inspection method for inspecting an alignment state of an electrode layer in a secondary battery by radiating an X-ray beam to a secondary battery set including at least one secondary battery and supported by a support unit rotating the at least one secondary battery in place, the secondary battery inspection method including dividing the secondary battery set into an interest area and a non-interest area, radiating an X-ray beam to the secondary battery set using an X-ray source, and detecting an X-ray beam passing through the secondary battery set, wherein at least one selected from a division angle between a plurality of X-ray radiation points and an X-ray radiation time is differentiated depending on whether the X-ray source photographs the interest area of the secondary battery set or the non-interest area of the secondary battery set.

When the X-ray source photographs the interest area of the secondary battery set, the division angle between a plurality of X-ray radiation points may be relatively small compared to when the non-interest area of the secondary battery set is photographed.

When the X-ray source photographs the interest area of the secondary battery set, a period of time an X-ray beam is radiated to the secondary battery set may be relatively long compared to when the non-interest area of the secondary battery set is photographed.

Advantageous Effects

According to the present disclosure including the configuration described above, first, a secondary battery inspection apparatus that may divide a secondary battery into an interest area and a non-interest area and control a set value for image detection to thereby ensure reliability of an inspection result without deterioration of image quality even when a plurality of secondary batteries are inspected simultaneously may be provided, wherein the interest area relates comparatively greatly to detection of defective goods with respect to the secondary battery and the non-interest area relates comparatively less to detection of defective goods and quality inspection.

Second, the secondary battery inspection apparatus that may inspect a plurality of secondary batteries together, and thus inspect all secondary batteries rapidly may be also provided.

Third, since defective goods may be selected by inspecting all secondary batteries produced, a secondary battery inspection apparatus may be provided that may ensure stability of secondary batteries on the market.

DESCRIPTION OF DRAWINGS

FIG. 1 is a perspective view of a secondary battery inspection apparatus according to an embodiment of the present disclosure;

FIG. 2 is an internal perspective view of the secondary battery inspection apparatus according to an embodiment of the present disclosure;

FIG. 3 is a schematic diagram illustrating of an X-ray source in the secondary battery inspection apparatus and a secondary battery according to an embodiment of the present disclosure;

FIG. 4 is a schematic diagram illustrating an example of an interest area and a non-interest area of a secondary battery set according to an embodiment of the present disclosure;

FIG. 5 is a layout of main components of the secondary battery inspection apparatus according to an embodiment of the present disclosure;

FIG. 6 is a diagram illustrating an example of different division angles and X-ray radiation times depending on an interest area and a non-interest area according to an embodiment of the present disclosure;

FIG. 7 is a diagram illustrating an X-ray image of the secondary battery set detected according to an embodiment of the present disclosure; and FIG. 8 is a flowchart of a secondary battery inspection method according to an embodiment of the present disclosure.

BEST MODE

Hereinafter, an embodiment of the present disclosure will be described in detail with reference to the attached drawings. However, the present disclosure described as above is not limited by the aspects described herein and accompanying drawings. It should be apparent to those skilled in the art that various substitutions, changes, and modifications which are not exemplified herein but are still within the spirit and scope of the present disclosure may be made.

FIG. 1 is a perspective view of a secondary battery inspection apparatus 100 according to an embodiment of the present disclosure.

Referring to FIG. 1, an outer part of the secondary battery inspection apparatus 100 according to an embodiment of the present disclosure is covered by a casing 101. The casing 101 includes a material with a thickness such that an X-ray beam exposed inside the casing 101 is completely shielded.

In addition, the secondary battery inspection apparatus 100 includes a controller 140 configured to control the secondary inspection apparatus 100. The controller 140 includes a display, an operation button, an input unit, etc., wherein the display shows a detected image of a secondary battery, etc., the operation button is configured to select power on/off of the secondary battery inspection apparatus 100, etc., and the input unit is configured to input an inspection set value, etc.

FIG. 2 is an internal perspective view of the secondary battery inspection apparatus 100 according to an embodiment of the present disclosure.

Referring to FIG. 2, the secondary battery inspection apparatus 100 according to an embodiment of the present disclosure further includes a transfer unit 110, an X-ray source 120, an X-ray detector 130, and a determination unit (not shown), wherein the transfer unit 110 transfers a secondary battery, the X-ray source 120 radiates an X-ray beam to the secondary battery, and the X-ray detector 130 detects a projected image of the secondary battery generated by the radiated X-ray beam.

The transfer unit 110 is provided on the entirety of the secondary battery inspection apparatus 100. The transfer unit 110 loads and continuously transfers the secondary battery set 10, received in the secondary battery inspection apparatus 100, so that the secondary battery set 10 receives inspection for determining whether the secondary battery set 10 is defective. When the inspection is finished, the secondary battery set 10 is unloaded and ejected to the outside. Like a general secondary battery inspection apparatus, the transfer unit 110 may include a transfer conveyor and a transfer guide and be driven by a motor. Secondary batteries are transferred in a line to receive stable and effective defect inspection. Particularly, when the inspection is finished, the secondary batteries are transferred again by the transfer unit 110. According to a result of the inspection, the secondary battery may be divided into non-defective goods and defective goods, and respectively transferred and unloaded by different transfer units 110. To do so, the transfer units 100 may include a loading unit, an unloading unit, a battery alignment unit, a moving unit, a battery reception unit, a battery ejection unit, and a battery inspection unit according to functions.

In the secondary battery inspection apparatus 100 according to an embodiment of the present disclosure, the secondary battery set 10 including at least one secondary battery is transferred on the transfer unit 110. Particularly, a plurality of secondary batteries included in the secondary battery set 10 are combined with one another so that a plurality of electrode layers included in each of the secondary batteries are arranged in parallel. At least four secondary batteries may be combined with one another in parallel. Alternatively, secondary batteries corresponding to an amount determined by the battery alignment unit in the transfer unit 110 may be automatically aligned and transferred.

FIG. 3 is a schematic diagram illustrating the X-ray source in the secondary battery inspection apparatus and a secondary battery according to an embodiment of the present disclosure. FIG. 4 is a schematic diagram illustrating an example of an interest area and a non-interest area of the secondary battery set according to an embodiment of the present disclosure. FIG. 5 is a layout of main components of the secondary battery inspection apparatus according to an embodiment of the present disclosure.

Referring to FIGS. 3 to 5, the X-ray source 120 radiates an X-ray beam to the secondary battery set 10 that is transferred by the transfer unit 110 and stops at a preset inspection position to thereby detect an X-ray beam passing through the secondary battery set 10.

The transfer unit 110 transfers the secondary battery set 10 to an inspection position between the X-ray source 120 and the X-ray detector 130. The secondary battery set 10 is supported by the support unit 111 rotating the secondary battery set 10 in place in the battery inspection unit of the transfer unit 110. The support unit 111 rotates the secondary battery set 10 in place according to a preset division angle between a plurality of X-ray radiation points and a time for which an X-ray beam is radiated to the secondary battery set 10 to thereby continuously detect an image of the secondary battery set 10. The support unit 111 may support the secondary battery set 10 to be inclined at a predetermined angle such that a border portion or an edge portion of a plurality of electrode layers is oriented toward the X-ray source 120 to accurately radiate the X-ray beam from the X-ray source 120 to the secondary battery set 10, wherein a stack state or an alignment state of the electrode layers in a secondary battery may be checked at the border portion or the edge portion.

Among X-ray tubes with a great focal spot, the X-ray source 120 may include a high-output micro X-ray tube with a rated output of 150 kV or greater. By performing photographing at a small division angle in the interest area for a long time using such high-output micro X-ray tube of 150 kV or greater, a total number of photographing instances may be reduced.

The X-ray detector 130 may continuously detect a projected image of the secondary battery set 10 generated by the X-ray beam radiated from the X-ray source 120, and include a charged coupled (CCD) area camera, a flat-panel detector, a time delay integration (TDI) camera, or the like.

In this case, a point to which the X-ray beam is radiated from the X-ray source 120 and the X-ray detector 130 may be aligned in a line with the secondary battery set 10 supported by the support unit 111. Thus, when the X-ray beam is radiated from the X-ray source 120 to the secondary battery set 10, a projected image of the secondary battery set 10 may be clearly detected by the X-ray detector 130.

In addition, the X-ray source 120 may selectively detect an image by limiting inspection of the secondary battery set 10 to a portion of the secondary battery set 10 instead of the entirety of the secondary battery set 10, according to an input from the controller 140.

The controller 140 controls operations of the transfer unit 110, the X-ray source 120, and the X-ray detector 130. The controller 140 uniformly divides the secondary battery set 10 according to a division angle between a plurality of X-ray radiation points to thereby detect an image during an X-ray radiation time. In addition, the controller 140 controls the support unit 111 supporting the secondary battery set 10 to rotate the secondary battery set 10 in place by a division angle between a plurality of X-ray radiation points with respect to each photographing for continuously detecting an image and the X-ray source 120 to radiate an X-ray beam during the X-ray radiation time.

In this case, the secondary battery set 10 is divided into an interest area A and a non-interest area B. Thus, the controller 140 controls the operations by differentiating at least one selected from a division angle between a plurality of X-ray radiation points and an X-ray radiation time depending on whether the X-ray source 120 photographs the interest area A or whether the X-ray source 120 photographs the non-interest area B.

A secondary battery has a rectangular parallelepiped shape and is provided by stacking a plurality of electrode layers in a plate shape in the secondary battery. The interest area A of the secondary battery set 10 is a border portion or an edge portion of the secondary battery set 10 in which a stack state or an alignment state of a plurality of electrode layers in the secondary battery may be checked. A portion in which it is easy to observe stack and alignment states of internal electrode layers to detect defective goods and perform quality inspection with respect to the secondary battery set 10 may be set as the interest area A. A plane area of an outer circumference surfaced of the secondary battery in which a stack state or an alignment state of a plurality of electrode layers in the secondary battery may not be checked may be set as the non-interest area B of the secondary battery set 10.

Accordingly, high-density photographing needs to be performed in the interest area A of the secondary battery set 10, compared to the non-interest area B. To do so, when the X-ray source 10 photographs the interest area A of the secondary battery set 10, a division angle between a plurality of X-ray radiation points may be less or an X-ray beam radiation time with respect to the non-interest area B of the secondary battery set 10 may be longer, compared to when the X-ray source 120 photographs the non-interest area B of the secondary battery set 10. In addition, when the interest area A of the secondary battery set 10 is photographed by adopting the two above-described conditions including the division angle between a plurality of X-ray radiation points and the X-ray radiation time, the division angle between the X-ray radiation points with respect to the interest area A of the secondary battery set 10 may be less compared to when the X-ray source 120 photographs the non-interest area B of the secondary battery set 10 and the X-ray beam radiation time with respect to the interest area A of the secondary battery set 10 may be shorter compared to when the X-ray source 120 photographs the non-interest area B of the secondary battery set 10.

When an image of the interest area A is detected, an X-ray radiation time may be set to 0.07 seconds to 0.1 seconds. When an image of the non-interest area B is detected, an X-ray radiation time may be set to 0.03 seconds to 0.05 seconds, which is comparatively shorter than the X-ray radiation time in the interest area A.

In detail, during a preset X-ray radiation time, when an X-ray beam is generated from the X-ray source 120, passes through the secondary battery set 10, and is thus detected by the X-ray detector 130, the support unit 111 supporting the secondary battery set 10 rotates the secondary battery set 10 at a preset division angle. Then, an X-ray beam is generated again from the X-ray source 120 for a preset X-ray radiation time and passes through the secondary battery set 10 to thereby be detected by the X-ray detector 130. Such process is finished when a tomography of the secondary battery set 10 may be detected through three-dimensional (3D) reconstruction processing of the secondary battery set 10, etc. Then, the same process is repeatedly performed on another secondary battery set 10 transferred by the transfer unit 110.

In this case, when a preset interest area A of the secondary battery set 10 is photographed, since the division angle for X-ray photographing and an X-ray radiation time are differentiated compared to when the non-interest area B is photographed, an inspection time may be reduced but image quality does not deteriorate. Thus, reliability of an inspection result may be ensured.

Alternatively, in a method of dividing the secondary battery set 10 into the interest area A and the non-interest area B, when an area where a portion in which an X-ray beam is radiated from the X-ray source 120 and has a cone shape in which a radius of the X-ray beam increases toward the X-ray detector 130 overlaps with a portion of the secondary battery set 10 rotated by the support unit 111 is large, the area is set as the interest area A. A remaining area in which the overlapping portion is rarely present is set as the non-interest area B. With respect to the interest area A and the non-interest area B divided using such method, as described above, a division angle between a plurality of X-ray radiation points and an X-ray radiation time may be differentiated. In this case, the secondary battery set 10 may not be divided into the interest area A and the non-interest area B. Instead, when an area where a portion of the secondary battery set 10 overlaps with an X-ray beam radiated from the X-ray source 120 is large, a division angle between a plurality of X-ray radiation points may be reduced, an X-ray radiation time may be extended, or a division angle between a plurality of X-ray radiation points may be reduced while extending an X-ray radiation time.

According to another embodiment of the present disclosure, when the X-ray source 120 photographs the interest area A of the secondary battery set 10, a rotation speed of the support unit 111 may be reduced compared to when the X-ray source 120 photographs the non-interest area B of the secondary battery set 10 to thereby increase an X-ray radiation time for the interest area A.

In addition, each of a plurality of X-ray sources 120 or a plurality of X-ray detectors 120 may be provided. The interest area A may also be divided into a plurality of interest areas. For example, the X-ray source 120 may include a first X-ray source and a second X-ray source. The X-ray detector 130 may include a first X-ray detector and a second X-ray detector. The interest area A may be divided into a first interest area and a second interest area. In this case, the first X-ray source and the first X-ray detector may continuously detect the first interest area of the secondary battery set 10, and the second X-ray source and the second X-ray detector may continuously detect the second interest area of the secondary battery set 10 to thereby reduce total inspection time for the secondary battery set 10. In this case, the transfer unit 110 may include an element arranged between the first X-ray source and the second X-ray source and configured to unload and eject the secondary battery set 10, determined as defective goods by the first X-ray detector, to the outside. By doing so, the secondary battery set 10 already determined as defective goods may not need to be inspected. Thus, a load of the secondary battery inspection apparatus 100 may be reduced, and speed and efficiency of inspection may improve. Alternatively, inspection of the interest area A may be repeatedly performed to increase accuracy of the inspection.

As a result of inspecting the secondary battery set 10 according to an embodiment of the present disclosure, it takes about 85 seconds to eject the secondary battery set 10 received in the secondary battery inspection apparatus 100 to the outside, and, with reference to the secondary battery set 10 in which four secondary batteries are combined with one another, it takes about 31.5 seconds to inspect the secondary battery set 10 by transferring the secondary battery set 10 to a preset inspection position, inspect the secondary battery set 10, and then transfer the secondary battery set 10 to the next position. Thus, inspection time may be reduced to ⅙ compared to general inspection time of about 3 minutes. In this case, since inspection time for one secondary battery is about 7.875 seconds, a secondary battery inspection apparatus at a speed of 7.5 ppm may be implemented.

FIG. 6 is a diagram illustrating an example of different division angles and X-ray radiation times depending on an interest area and a non-interest area according to an embodiment of the present disclosure.

Referring to FIG. 6, division angles between a plurality of X-ray radiation points are angles at which the support unit 111 rotates the secondary battery set 10 once in place (a and b degrees), and X-ray radiation time is a time period needed to photograph the secondary battery set 10 once (c and d seconds). The support unit 111 supporting the secondary battery set 10 rotates the secondary battery set 10 once in place in an e direction. For example, while the X-ray source 120 is photographing the non-interest area B, the secondary battery set 10 rotates by b degrees and, after the rotation, stops for c seconds to perform the photographing. Likewise, while the X-ray source 120 is photographing the interest area A, the secondary battery set 10 rotates by a degrees and, after the rotation, stops for d seconds to perform the photographing, wherein the a degrees are less than the b degrees and the d seconds are less than the c seconds needed when the non-interest area B is photographed.

FIG. 7 is a diagram illustrating an X-ray image of a secondary battery set 10 detected according to an embodiment of the present disclosure.

In the secondary battery inspection apparatus 100 according to the present disclosure, the determination unit (not shown) may automatically determine whether a secondary battery is defective according to a set value input to the controller 140. However, an inspector may also visually check a projected image of the secondary battery set 10 generated by the X-ray detector 130 via the display in the controller 140, as shown in FIG. 7, and manually determine whether the secondary battery is defective.

FIG. 8 is a flowchart of a secondary battery inspection method according to an embodiment of the present disclosure.

Referring to FIG. 8, the secondary battery inspection method according to another embodiment of the present disclosure is a method for inspecting an alignment state of electrode layers in a secondary battery by radiating an X-ray beam to the secondary battery set 10 including at least one secondary battery. The secondary battery inspection method includes a step of area division (S1) for dividing the secondary battery set 10 into the interest area A and the non-interest area B, a step of radiation (S2) for radiating an X-ray beam to the secondary battery set 10 using the X-ray source 120, and a step of detection (S3) for detecting an X-ray beam passing through the secondary battery set 10.

The secondary battery inspection method may be implemented by the secondary battery inspection apparatus 100 including the transfer unit 110, the X-ray source 120, the X-ray detector 130, and the controller 140.

In the area division (S1), the interest area A of the secondary battery set 10 is a border portion or an edge portion of a plurality of electrodes in the secondary battery set 10 in which a stack state or an alignment state of the electrode layers may be checked. A portion in which it is easy to observe stack and alignment states of internal electrode layers to detect defective goods and perform quality inspection with respect to the secondary battery set 10 may be set as the interest area A. A plane portion of an outer circumference surface of the secondary battery in which a stack state or an alignment state of a plurality of electrode layers in the secondary battery may not be checked may be set as the non-interest area B of the secondary battery set 10.

When the step of area division (S1) is finished, the secondary battery set 10 is received in the secondary battery inspection apparatus 100, loaded through the transfer unit 110 provided on the entirety of the secondary battery inspection apparatus 100, and continuously transferred into the secondary battery inspection apparatus 100 to receive inspection. When the inspection is finished, the secondary battery set 10 is unloaded and ejected to the outside.

A plurality of secondary batteries in the secondary battery set 10 may be combined with one another so that a plurality of electrode layers in each of the secondary batteries are arranged in parallel. At least four secondary batteries may be combined with one another in parallel and transferred.

The secondary battery set 10 is mounted in the support unit 111 in the battery inspection unit of the transfer unit 110. The support unit 111 rotates the secondary battery set 10 in place according to a preset division angle between a plurality of X-ray radiation points and an X-ray radiation time to thereby continuously detect an image of the secondary battery set 10. When detection of an image of the secondary battery set 10 is finished, the secondary battery set 10 is removed from the support unit 111 and transferred again via the transfer unit 110.

In the step of radiation (S2), an X-ray beam is radiated to the secondary battery set 10. The X-ray source 120 configured to radiate an X-ray beam may include a high-output micro X-ray tube with a rated output of at least 150 kV.

In the step of detection (S3), an X-ray beam radiated from the secondary battery set 10 and passing through the secondary battery set 10 is continuously detected by the X-ray detector 130.

The controller 140 configured to control operations of the transfer unit 110, the X-ray source 120, and the X-ray detector 130 uniformly divides the secondary battery set 10 according to a division angle between a plurality of X-ray radiation points to thereby detect an image during an X-ray radiation time. In addition, the controller 140 rotates the secondary battery set 10 in place by a division angle between a plurality of X-ray radiation points with respect to each photographing for continuously detecting an image so that the X-ray source 120 radiates an X-ray beam during the X-ray radiation time.

In the interest area A of the secondary battery set 10 obtained as a result of the dividing in the step of area division (S1), high-density photographing needs to be performed in the step of radiation (S2) and the step of detection (S3) compared to the non-interest area B. To do so, a division angle between a plurality of X-ray radiation points may be reduced and X-ray radiation time may increase in the interest area A.

When an image of the interest area A is detected, the X-ray radiation time may be set to 0.07 seconds to 0.1 seconds. When an image of the non-interest area B is detected, the X-ray radiation time may be set to 0.03 seconds to 0.05 seconds, which is comparatively shorter than the X-ray radiation time in the interest area A.

After the secondary batteries undergo the step of detection (S3), the secondary batteries are transferred again by the transfer unit 110. According to a result of performing the step of detection (S3), the secondary batteries may be transferred and unloaded as non-defective goods and defective goods, respectively, to different transfer units.

Alternatively, the step of radiation (S2) and the step of detection (S3) may be repeatedly performed a plurality of times. As described above, the repeated performing of the step of radiation (S2) and the step of detection (S3) may be performed when a plurality of X-ray sources 120 and a

DESCRIPTION OF REFERENCE NUMERALS

| 10: Secondary battery set | 100: Secondary battery inspection apparatus |
| 101: Casing | 110: Transfer unit |
| 111: Support unit | 120: X-ray source |
| 130: X-ray detector | 140: Controller |
| A: Interest area | B: Non-interest area |

The invention claimed is:

1. A secondary battery inspection apparatus comprising:
a support unit configured to support a secondary battery set including at least one secondary battery;
an X-ray source configured to radiate an X-ray beam to the secondary battery set; and
an X-ray detector configured to detect the X-ray beam generated from the X-ray source and passing through the secondary battery set,
wherein the secondary battery set is divided into an interest area and a non-interest area, the support unit rotates the secondary battery set in place, and at least one selected from a division angle between a plurality of X-ray radiation points and an X-ray radiation time is differentiated depending on whether the X-ray source photographs the interest area or whether the X-ray source photographs the non-interest area,
when the X-ray source photographs the interest area of the secondary battery set, the division angle between a plurality of X-ray radiation points is relatively small compared to when the non-interest area of the secondary battery set is photographed, and
when the X-ray source photographs the interest area of the secondary battery set, a period of time an X-ray beam is radiated to the secondary battery set is relatively long compared to when the non-interest area of the secondary battery set is photographed.

2. The secondary battery inspection apparatus of claim 1, wherein positions of the X-ray source and the X-ray detector are fixed and, when the X-ray source photographs the interest area of the secondary battery set, a rotation speed of the support unit is less compared to when the X-ray source photographs the non-interest area of the secondary battery set.

3. The secondary battery inspection apparatus of claim 1, wherein the at least one secondary battery is provided by stacking a plurality of electrode layers with a plate shape in the at least one secondary battery, and the interest area of the secondary battery set is a border portion in which a stack state or an alignment state of the plurality of electrode layers in the at least one secondary battery may be checked.

4. The secondary battery inspection apparatus of claim 3, wherein the at least one secondary battery is provided to have a rectangular parallelepiped shape,
the interest area of the secondary battery set is the border portion or an edge portion in which the stack state or an alignment state of the plurality of electrode layers in the at least one secondary battery may be checked, and
the non-interest area of the secondary battery set is a plane portion of an outer circumference surface of the at least one secondary battery in which the stack state or the alignment state of the plurality of electrode layers in the at least one secondary battery may not be checked.

5. The secondary battery inspection apparatus of claim 3, wherein a plurality of secondary batteries in the secondary battery set are combined with one another so that a plurality of electrode layers in each of the plurality of secondary batteries are arranged in parallel.

6. The secondary battery inspection apparatus of claim 5, wherein at least four secondary batteries are combined with one another in parallel in the secondary battery set.

7. The secondary battery inspection apparatus of claim 1, wherein the X-ray source has a rated output of at least 150 kV.

8. A secondary battery inspection method for inspecting an alignment state of an electrode layer in a secondary battery by radiating an X-ray beam to a secondary battery set comprising at least one secondary battery and supported by a support unit rotating the at least one secondary battery in place, the secondary battery inspection method comprising:
dividing the secondary battery set into an interest area and a non-interest area;
radiating an X-ray beam to the secondary battery set using an X-ray source; and
detecting an X-ray beam passing through the secondary battery set,
wherein at least one selected from a division angle between a plurality of X-ray radiation points and an X-ray radiation time is differentiated depending on whether the X-ray source photographs the interest area of the secondary battery set or the non-interest area of the secondary battery set,
when the X-ray source photographs the interest area of the secondary battery set, the division angle between a plurality of X-ray radiation points is relatively small compared to when the non-interest area of the secondary battery set is photographed, and
when the X-ray source photographs the interest area of the secondary battery set, a period of time an X-ray beam is radiated to the secondary battery set is relatively long compared to when the non-interest area of the secondary battery set is photographed.

* * * * *